United States Patent [19]

Munn

[11] 3,955,444
[45] May 11, 1976

[54] EPICYCLIC CHANGE-SPEED HUBS

[75] Inventor: David Curtis Munn, Nottingham, England

[73] Assignee: Raleigh Industries Limited, Nottingham, England

[22] Filed: Mar. 18, 1974

[21] Appl. No.: 451,762

[30] Foreign Application Priority Data
Mar. 23, 1973 United Kingdom............... 14250/73

[52] U.S. Cl............................................. 74/750 B
[51] Int. Cl.......................................... F16H 57/10
[58] Field of Search...................... 74/750 B, 781 B; 192/6 A, 6 B

[56] References Cited
UNITED STATES PATENTS

| | | | |
|---|---|---|---|
| 3,186,259 | 6/1965 | La Brie | 74/750 B |
| 3,299,745 | 1/1967 | Toplis | 74/750 B |
| 3,432,013 | 3/1969 | Matsumoto | 74/750 B X |
| 3,433,097 | 3/1969 | Fox | 74/750 B |
| 3,608,398 | 9/1971 | Segawa et al. | 74/750 B X |

Primary Examiner—Samuel Scott
Assistant Examiner—Lance W. Chandler
Attorney, Agent, or Firm—Lackenbach, Lilling & Siegel

[57] ABSTRACT

An epicyclic change-speed hub for a bicycle has a driver which overlaps both the planet cage and gear ring in the axial direction of the hub and is connectable with such planet cage and gear ring by respective pawl and ratchet couplings. A spring-loaded coupling sleeve is provided which is movable axially of the hub and such sleeve serves to control, according to its axial position, the operation or otherwise of the coupling between the driver and the planet cage. The coupling sleeve is in two parts, one part being intended to control the coupling between the driver and the planet cage and the other part being co-operable, according to position, with a pawl and ratchet coupling between the gear ring and hub shell to control the operation of such latter coupling. The spring loading is applied to the coupling sleeve parts between the sleeve and a fixed datum and also between the individual parts of the sleeve.

15 Claims, 4 Drawing Figures

EPICYCLIC CHANGE-SPEED HUBS

The invention concerns epicyclic change-speed hubs and has more particular reference to change-speed hubs for bicycles and the like.

The primary object of the present invention is to provide an effective change-speed hub for a bicycle or like wheel which is of simple construction and is reliable in operation.

According to the present invention an epicyclic change-speed hub comprising a hub axle, a fixed sun gear secured to the said axle, a plurality of planet gears angularly spaced about the sun gear and in mesh therewith, a planet cage supporting the planet gears and arranged coaxially with the axle, a gear ring having internal teeth in register with and engaged by the planet gears, a driver arranged in overlapping axial relationship with the planet cage and gear ring, a first unidirectional clutch means connecting the driver with the planet cage, a second unidirectional clutch means connecting the driver with the gear ring, a hub shell arranged coaxially with the axle and disposed radially outwardly of the planet cage and gear ring, third and fourth unidirectional clutch means respectively, connecting the planet cage and gear ring with the hub shell, sleeve means slidably mounted for motion longitudinally of the axle, the sleeve means being adapted, according to its position axially of the hub, selectively to disengage the first and fourth unidirectional clutch means and a displacement means adapted to effect adjustment of the sleeve means in the axial direction of the hub is characterised in that the sleeve means comprises two sleeve members arranged in axially aligned disposition and slidably mounted on the axle and a resilient means resiliently loading the sleeve means outwardly of the hub and away from each other, the sleeve members being adapted to co-operate, according to their positions axially of the hub, with the first and fourth unidirectional clutch means respectively.

According to a preferred feature of the invention, the epicyclic change-speed hub aforesaid is further characterised by a disengagement means carried by the driver and actuable by the sleeve means to effect disengagement of the fourth unidirectional clutch means.

Preferably, the displacement means comprises an expandible ring located peripherally of the driver and having enlargements which extend through such driver for co-operation with the sleeve means.

According to a further preferred feature, the first and second unidirectional clutch means are arranged in adjacent side-by-side disposition within the hub.

The unidirectional clutch means will usually comprise co-operating pawl and ratchet means and the disengagement of such means will be effected by tripping the pawls.

The invention will now be described further, by way of example only, with reference to the accompanying drawings illustrating one embodiment thereof and in which.

Figure 1:
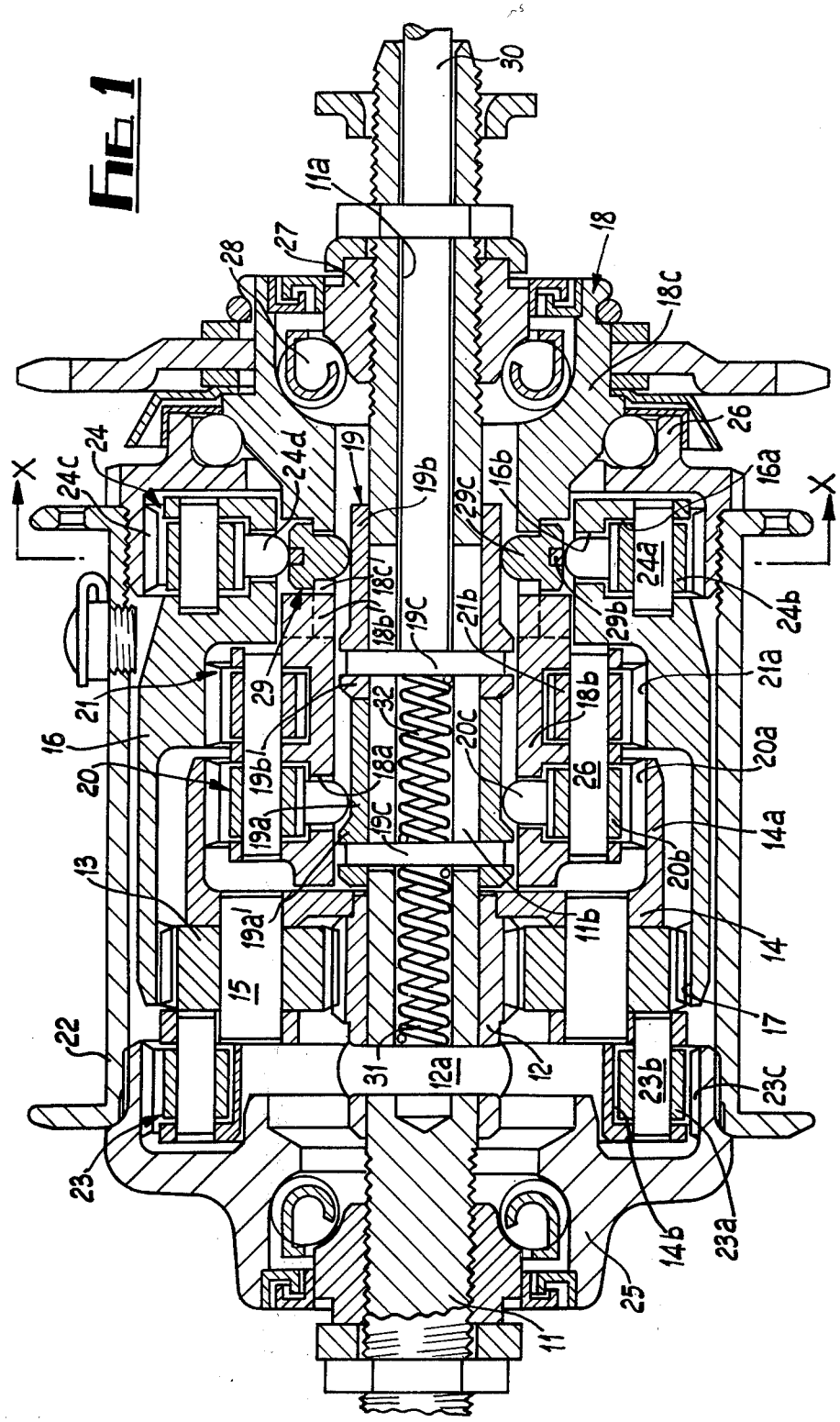
FIG. 1 is a longitudinal section taken through a change-speed hub constructed in accordance with the present invention, the hub being shown with a relative disposition of parts appropriate to a high gear condition of the hub.

Referring now to the drawings, an epicyclic three speed hub for a bicycle or the like comprises a hub axle 11 having a fixed sun gear 12 thereon, a plurality of planet gears 13 angularly spaced about the sun gear and in mesh therewith, a planet cage 14 supporting the planet gears on planet pins 15 carried by the cage, a gear ring 16 arranged coaxially with the axle and with the planet cage and having internal teeth 17 in axial register with and engaged by the planet gears, a driver 18 extending axially of the hub and disposed radially inwardly of the gear ring and of a part of the planet cage, a sleeve means 19 slidably mounted on the hub axle and positioned radially inwardly of the driver, first and second co-operating pawl and ratchet means 20, 21 connecting the driver with the planet cage and with the gear ring respectively, a hub shell 22 arranged coaxially with the axle and disposed radially outwardly of the planet cage and gear ring, and third and fourth co-operating pawl and ratchet means 23, 24 respectively, the former connecting the planet cage and the latter the gear ring with the hub shell.

The axle 11 has a blind axial bore 11a thereto and approximately centrally of the hub such axle is provided with diametrically opposed slots 11b for a purpose hereafter to be made apparent.

The planet cage 14 has an axial extension directed towards the driver, such extension defining a flange 14a which lies radially outwardly of the end of the driver, and the said extension is formed with internal ratchet teeth 20a which co-operate with pawls 20b pivotally mounted in the driver in register with the teeth to form the first co-operating pawl and ratchet means 20 aforesaid. The pawls 20b have tails 20c which extend radially inwardly of the driver through apertures 18a therein, for a purpose hereafter to be made apparent. At that side of the planet cage directed away from the driver, such cage is formed with a peripheral groove 14b within which are located the pawls 23a of the third pawl and ratchet means, such pawls being pivotally mounted on pins 23b carried by the planet cage and being in register and engageable with internal ratchet teeth 23c provided on an end cover 25 secured to and arranged coaxially with the hub shell 22.

The gear ring 16 has internal ratchet teeth 21a intermediate its ends and positioned in register with pawls 21b carried by the driver on pins 26 which also support the pawls 20b, the ratchet teeth 21a and the pawls 21 defining the second co-operating pawl and ratchet means 21 before referred to.

At its outermost end the gear ring 16 includes a peripheral groove 16a within which are located, on pins 24a, the pawls 24b of the fourth pawl and ratchet means, such pawls being in register with internal ratchet teeth 24c provided on an end cover 26 secured to the hub shell. The pawls 24b have tails 24d which extend radially inwardly of the gear ring through apertures 16b therein, for a purpose hereafter to be made apparent.

Figure 2:
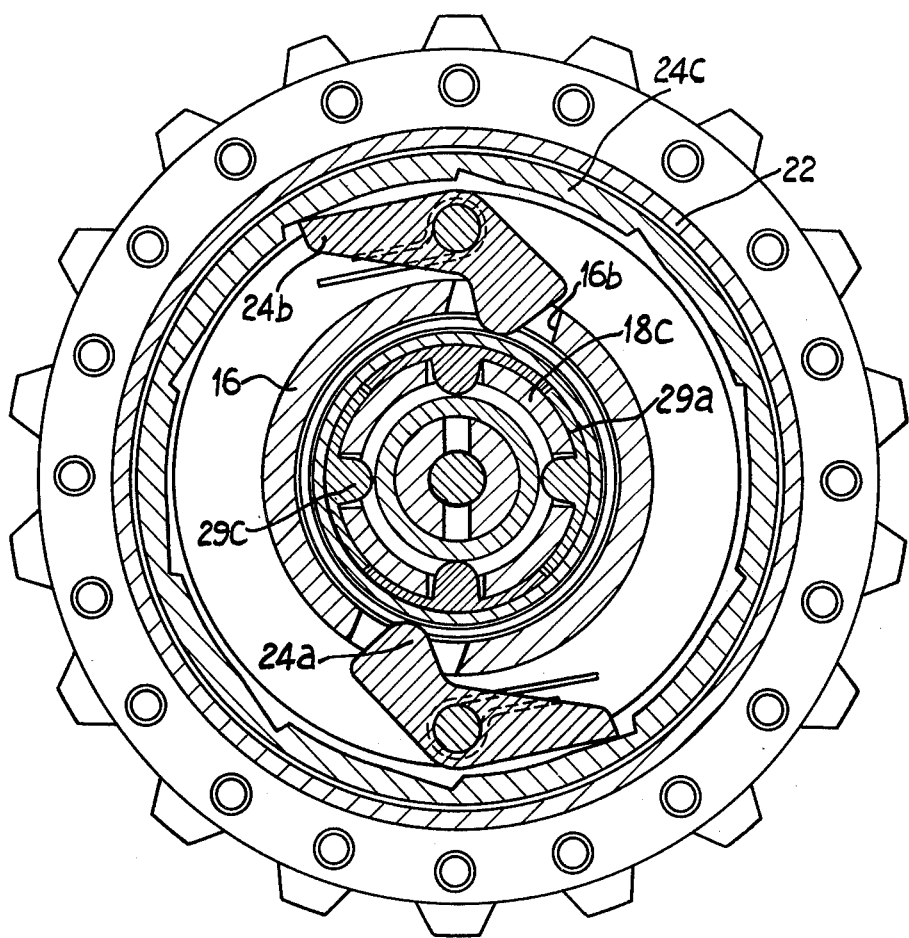
FIG. 2 is a section taken on line $x-x$ of FIG. 1.

The driver 18 comprises two axially aligned driver parts 18b, 18c, the innermost part 18b carrying the pawls 20b 21b of the first and second pawl and ratchet means, and the outermost part 18c being supported on the axle 11 by a cone 27 and a conventional ball-bearing assembly 28. The driver parts 18b 18c are drivingly connected by interdigitated fingers $18b^1$ $18c^1$ extending axially from the two parts and the part 18c has a stepped end region to define, together with part 18b, a groove to receive a multi-part expandable ring 29 (see FIG. 2) the parts 29a of the ring being held together and fully engaged with the groove by a resilient means 29b and each having an enlargement 29c which extends through the driver into the bore thereof.

The sleeve means 19 comprises two sleeve members 19a 19b each captively located on the axle by respective pins 19c passing through the members adjacent an end thereof and engaged with the slots 11b in the axle. Movement of the sleeve members axially of the hub is effected by means of a displacement means, conveniently in the form of a control rod 30, mounted coaxially of the bore 11a in the axle and bearing, at its inner end, on the outermost pin 19c. The sleeve members are spring loaded outwardly of the hub by two helical compression springs 31, 32 one of such springs being located between the pins 19c of the two members and the other spring being disposed between the pin 19c of the innermost sleeve member 19a and a retaining pin 12a securing the fixed sun-gear 12 to the axle.

Each of the sleeve members has a radial enlargement 19a$^1$ 19b$^1$ at its inner end, the enlargements being dimensioned such that on sliding movement of the members axially of the hub the enlargements will engage and have a camming action on the tails 20c of the pawls 20 or on the enlargements 29c of the expandable ring 29. Each enlargement 19a$^1$ 19b$^1$ has a detent or groove formation at its periphery positively to receive the pawl tails or the expandible ring enlargements into engagement therewith.

The rating of spring 31 is such that the spring will shift the sleeve members to the right, on adjustment of the control rod 30, only by a distance sufficient to bring the enlargement on sleeve member 19a into register with pawl tails 20c, further movement of such sleeve member 19a to the right, as seen in the drawings, on further adjustment of the control rod, being restrained by engagement of the tails 20c with the detent in the enlargement and the effect of spring 32.

Similarly, the rating of spring 32 is such as to move sleeve member 19b to a position for engagement of the detent by the enlargements 29c of the expandible ring, but the loading applied by the spring is inadequate to move the sleeve member beyond this position.

In this way an accurate and positive adjustment of the hub between the various gear positions is attained.

The pawls of the various co-operating pawl and ratchet means are spring-loaded into engagement with their respective ratchet teeth in conventional manner, by means not shown.

The operation of the hub is as follows:

With the relative disposition of parts shown in FIG. 1. which disposition of parts corresponds to a high gear condition of the hub, all of the pawls are in engagement with their respective ratchet teeth. Application of a drive motion to the driver from the chain sprocket secured thereto will transmit a motion to the planet cage through the pawl and ratchet means 20 and thence, via the planet gears and gear ring, to the hub through the pawl and ratchet means 24. Pawl and ratchet means 21 and 23 will be over-running, in view of the relative speeds of the parts they connect.

Figure 3:
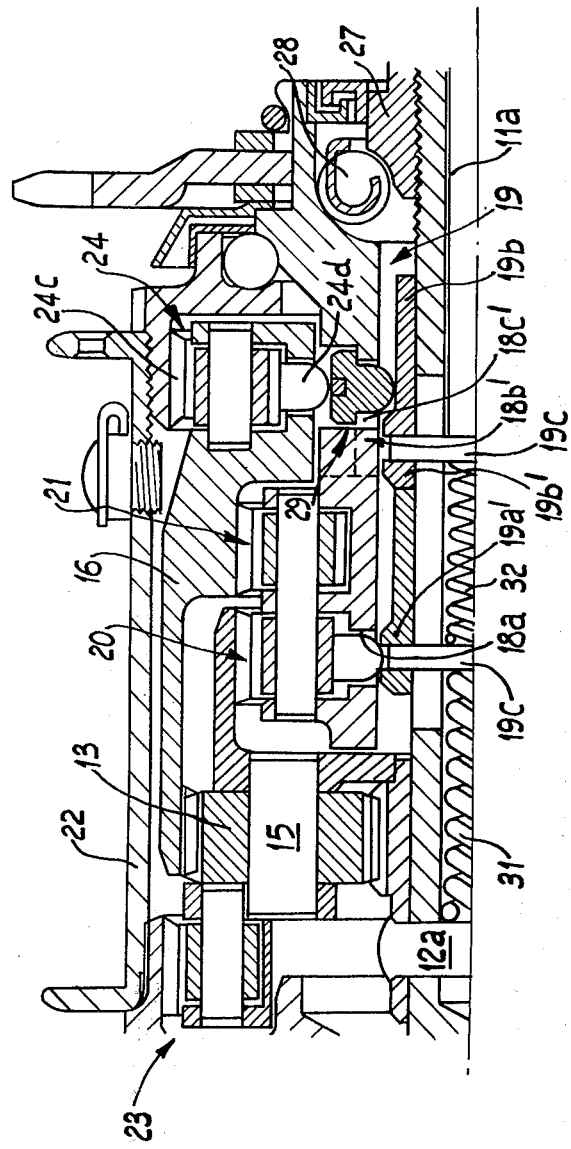
FIGS. 3 and 4 are views corresponding to FIG. 1 and show relative dispositions of parts appropriate to normal gear and low gear conditions of the hub.

Adjustment of the control rod to the right, either manually or by some external automatic control means, will cause the two sleeve members to move in unison under the effect of spring 31 in a like direction to give the relative disposition of parts shown in FIG. 3. As is apparent from the drawing, the englargement 19a$^1$ on the innermost sleeve element has engaged the tails 20c of pawls 20b and has tripped such pawls so that they no longer engage their related ratchet teeth. The pawls of the pawl and ratchet means 21, 23 and 24 are still engaged with their respective ratchet teeth and the drive transmission path is from the driver to the gear ring through pawl and ratchet means 21 and thence to the hub through the pawl and ratchet means 24. As in the case of high gear, the pawls of the pawl and ratchet means 23 are overrunning the related ratchet teeth.

Figure 4:
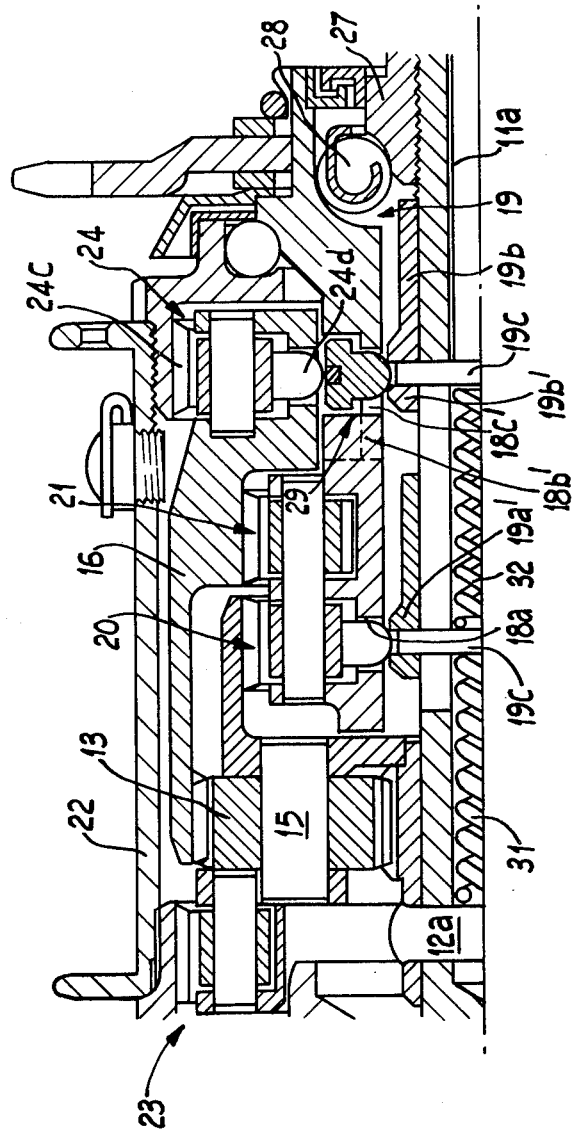

A further adjustment of the control rod to the right will give the relative disposition of parts shown in FIG. 4 such disposition corresponding to the low gear condition of the hub. It will be observed that the two sleeve members have separated, the rating of spring 31 being sufficient to shift the sleeve members in unison whilst the pawls 20b are tripped but being inadequate to shift sleeve member 19a beyond this position. Movement of the outermost sleeve member 19b brings the enlargement 19b$^1$ thereof into engagement with the enlargements 29c of the expandible ring thus to cam the ring outwardly against the restraint of the resilient means 29b and, in turn, to operate on the tails of pawls 24b to trip such pawls. The drive transmission path for low gear is from the driver to the gear ring through pawl and ratchet means 21 and from the gear ring through the planet gears to the planet cage. The final drive is from the planet cage to the hub shell through the pawl and ratchet means 23.

Normal gear is selected, from the relative diposition shown in FIG. 4 by moving the control rod inwardly to cause the outer sleeve member to revert to the position shown in FIG. 3.

The invention is not restricted to the exact features of the embodiment hereinbefore described since alternatives will readily present themselves to one skilled in the art. Thus, for example, instead of providing for the tripping of the pawls of the pawl and ratchet means 24 by means of a radial movement of an expandible ring, the sleeve member 19b may be adapted to effect such tripping by the axial displacement of a pawl actuator. Furthermore, whilst co-operating pawl and ratchet means are provided as a means of transmitting a drive motion, other unidirectional clutch means, as well know in the art, may be used if preferred. As an alternative to the two helical compression springs, a single such spring of which a part is restrained for limited extension may be used. Indeed, alternative resilient means to the compression springs may be utilised. For example, a prefabrication of spring discs may be substituted for each helical spring. In a still further arrangement the springs may be provided outwardly of the hub axle rather than being located in a blind bore in such axle.

What we claim is:

1. An epicyclic change-speed hub comprising a hub axle, a fixed sun gear secured to the said axle, a plurality of planet gears angularly spaced about the sun gear and in mesh therewith, a planet cage supporting the planet gears and arranged coaxially with the axle, a gear ring having internal teeth in register with and engaged by the planet gears, a driver arranged in overlapping axial relationship with the planet cage and gear ring, a first unidirectional clutch means connecting the driver with the planet cage, a second unidirectional clutch means connecting the driver with the gear ring, a hub shell arranged coaxially with the axle and disposed radially outwardly of the planet cage and gear ring, third and fourth unidirectional clutch means respectively connecting the planet cage and gear ring with the hub shell, sleeve means slidably mounted for motion longitudinally of the axle and for selectively disengaging the first and fourth unidirectional clutch means as a function of the axial position thereof along the hub, and a displacement means arranged to effect adjustment of the sleeve means in the axial direction of the hub, said sleeve means comprising two separable sleeve members arranged in axially aligned disposition and slidably mounted on the axle, and resilient means resiliently loading the sleeve members outwardly of the hub and away from each other, the sleeve members being arranged to co-operate, according to their positions axially of the hub, with the first and fourth unidirectional clutch means respectively.

2. An epicyclic change speed hub as claimed in claim 1, wherein the resilient means is provided within the hub axle and is operatively connected with the sleeve members through the axle.

3. An epicyclic change-speed hub as claimed in claim 1 wherein the resilient means comprises a plurality of resilient elements.

4. An epicyclic change-speed hub as claimed in claim 3 wherein a respective resilient element is provided for each sleeve member.

5. An epicyclic change-speed hub as claimed in claim 1 wherein the resilient elements are arranged in aligned end-to-end disposition.

6. An epicyclic change-speed hub as claimed in claim 3 wherein the resilient elements are of different and respective degrees of resilience.

7. An epicyclic change-speed hub as claimed in claim 1 wherein the resilient means comprises at least one helical spring.

8. An epicyclic change-speed hub as claimed in claim 2, wherein the resilient means is connected with the respective sleeve members by pins engaged with the said members and against which the said resilient means bears.

9. An epicyclic change-speed hub as claimed in claim 1 further characterised by a disengagement means caused by the driver and actuable by the sleeve means to effect disengagement of the fourth unidirectional clutch means.

10. An epicyclic change-speed hub as claimed in claim 9 wherein the disengagement means is operable in a plane arranged generally at right angles to the axis of the hub.

11. An epicyclic change-speed hub as claimed in claim 10, wherein the disengagement means comprises an expandible ring located peripherally of the driver and having enlargements which extend through such driver for co-operation with the sleeve means.

12. An epicyclic change speed hub as claimed in claim 1, wherein the first and second unidirectional clutch means are arranged in adjacent side-by-side disposition within the hub.

13. An epicyclic change-speed hub as claimed in claim 1, wherein each unidirectional clutch means comprises a pawl and ratchet mechanism.

14. An epicyclic change-speed hub as claimed in claim 1, wherein each of said two separable sleeve members includes detent means for releasably fixing the axial position thereof along the hub axle upon engagement with a respective one of said first and fourth unidirectional clutch means, whereby the adjustment of the hub between the various gear positions is accurate and positive.

15. An epicyclic change-speed hub as claimed in claim 14, wherein the resilient means comprises a separate biasing spring each of which is primarily associated with a different one of said two separable sleeve members, and wherein the rating of each spring is selected to successively axially move the associated sleeve members to clutch means engaging positions upon suitable axial actuation of said displacement means, said detent means fixing the positions of said sleeve members at the engaged positions against the action of said biassing springs, said detent means and biassing springs permitting said sleeve members to be moved from the clutch means engaged positions upon reverse axial actuation of said displacement means.

* * * * *